(12) United States Patent
Clark et al.

(10) Patent No.: US 11,255,209 B2
(45) Date of Patent: Feb. 22, 2022

(54) CMC BOAS ARRANGEMENT

(71) Applicant: United Technologies Corporation, Farmington, CT (US)

(72) Inventors: Thomas E. Clark, Sanford, ME (US); William M. Barker, North Andover, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 146 days.

(21) Appl. No.: 16/555,235

(22) Filed: Aug. 29, 2019

(65) Prior Publication Data
US 2021/0062671 A1 Mar. 4, 2021

(51) Int. Cl.
*F01D 11/08* (2006.01)
*F01D 5/14* (2006.01)
*F01D 9/04* (2006.01)

(52) U.S. Cl.
CPC ............. *F01D 11/08* (2013.01); *F01D 5/147* (2013.01); *F01D 9/04* (2013.01); *F05D 2230/60* (2013.01); *F05D 2230/64* (2013.01); *F05D 2240/55* (2013.01); *F05D 2260/36* (2013.01); *F05D 2300/211* (2013.01); *F05D 2300/6033* (2013.01)

(58) Field of Classification Search
CPC .......... F01D 11/005; F01D 11/08; F01D 9/04; F05D 2240/11
See application file for complete search history.

(56) References Cited

U.S. PATENT DOCUMENTS

| 6,464,457 | B1* | 10/2002 | Morgan | F01D 11/005 |
| | | | | 277/630 |
| 6,884,026 | B2 | 4/2005 | Glynn et al. | |
| 7,278,820 | B2* | 10/2007 | Keller | F01D 11/08 |
| | | | | 415/173.1 |
| 7,563,071 | B2 | 7/2009 | Campbell et al. | |
| 8,998,565 | B2* | 4/2015 | Foster | F01D 25/246 |
| | | | | 415/116 |
| 9,863,265 | B2 | 1/2018 | Stapleton | |

(Continued)

FOREIGN PATENT DOCUMENTS

| EP | 3043032 | 7/2016 |
| EP | 3081759 | 10/2016 |

(Continued)

OTHER PUBLICATIONS

Department of Mechanical and Aerospace Engineering at University of Florida, "Design for Manufacturing and Assembly (DFMA) Tips". (Year: 2017).*

(Continued)

*Primary Examiner* — David E Sosnowski
*Assistant Examiner* — Wesley Le Fisher
(74) *Attorney, Agent, or Firm* — Carlson, Gaskey & Olds, P.C.

(57) ABSTRACT

A blade outer air seal assembly includes a carrier that has a slot and a hole that extends into the slot. A blade outer air seal has a plurality of segments that extend circumferentially about an axis and mounted in the carrier. At least one of the plurality of segments has a base portion and a first wall that extends axially and radially outwardly from the base portion. The first wall has an aperture. A pin extends through the hole and the aperture.

14 Claims, 6 Drawing Sheets

(56) References Cited

U.S. PATENT DOCUMENTS

| | | | |
|---|---|---|---|
| 9,945,256 B2 | 4/2018 | Freeman et al. | |
| 10,858,949 B2 | 12/2020 | Watson et al. | |
| 10,982,564 B2* | 4/2021 | Weaver | F01D 25/005 |
| 2009/0110546 A1* | 4/2009 | Tholen | F01D 11/08 |
| | | | 415/173.3 |
| 2016/0305286 A1* | 10/2016 | Heitman | F02C 3/04 |
| 2017/0002674 A1 | 1/2017 | Vetters et al. | |
| 2017/0044920 A1* | 2/2017 | Vetters | F01D 25/246 |
| 2017/0175572 A1* | 6/2017 | Vetters | F01D 25/12 |
| 2018/0195403 A1 | 7/2018 | Kerns et al. | |
| 2018/0230857 A1* | 8/2018 | Weaver | F01D 25/005 |
| 2019/0024516 A1* | 1/2019 | Thomas | F01D 11/08 |
| 2019/0284958 A1* | 9/2019 | Schilling | F01D 25/246 |
| 2019/0360351 A1* | 11/2019 | Walston | F01D 11/122 |

FOREIGN PATENT DOCUMENTS

| | | |
|---|---|---|
| EP | 3118417 | 1/2017 |
| WO | 2015191186 | 12/2015 |

OTHER PUBLICATIONS

Extended European Search Report for EP Application No. 20191608.7 dated Dec. 3, 2020.

* cited by examiner

CMC BOAS ARRANGEMENT

BACKGROUND

This application relates to a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY OF THE INVENTION

In one exemplary embodiment, a blade outer air seal assembly includes a carrier that has a slot and a hole that extends into the slot. A blade outer air seal has a plurality of segments that extend circumferentially about an axis and mounted in the carrier. At least one of the plurality of segments has a base portion and a first wall that extends axially and radially outwardly from the base portion. The first wall has an aperture. A pin extends through the hole and the aperture.

In a further embodiment of any of the above, the first wall is circumferentially spaced from a second wall and extends axially and radially outwardly from the base portion.

In a further embodiment of any of the above, the second wall has a second aperture.

In a further embodiment of any of the above, the first wall and the second wall each have a forward aperture and an aft aperture.

In a further embodiment of any of the above, the forward apertures are larger than the aft apertures.

In a further embodiment of any of the above, the carrier has four slots. Each slot has a hole and a pin that extends through each hole.

In a further embodiment of any of the above, the carrier has a hook configured to attach to a support structure.

In a further embodiment of any of the above, the hook extends in a circumferential direction.

In a further embodiment of any of the above, the hole is countersunk.

In a further embodiment of any of the above, the pin is press fit into the hole.

In a further embodiment of any of the above, the pin is oriented in a generally circumferential direction.

In a further embodiment of any of the above, a rope seal is arranged between the at least one segment and the carrier.

In a further embodiment of any of the above, a feather seal is arranged between two adjacent seal segments.

In a further embodiment of any of the above, the pin is a metallic material.

In a further embodiment of any of the above, the at least one segment is a ceramic material.

In a further embodiment of any of the above, at least a portion of the at least one segment is coated in a silica material.

In a further embodiment of any of the above, the carrier is a metallic material.

In another exemplary embodiment, a method of assembling a blade outer air seal includes providing a blade outer air seal segment that has a base portion and a first wall that extends axially and radially outwardly from the base portion. A second wall is circumferentially spaced from the first wall. The first wall has an aperture. The first wall is inserted into a slot on a carrier. The carrier has a hole that extends into the slot. A pin is inserted circumferentially through the hole and the aperture.

In a further embodiment of any of the above, a rope seal is inserted between the blade outer air seal segment and the carrier.

In a further embodiment of any of the above, the blade outer air seal segment is a ceramic material. The carrier is a metallic material.

DETAILED DESCRIPTION

Figure 1:
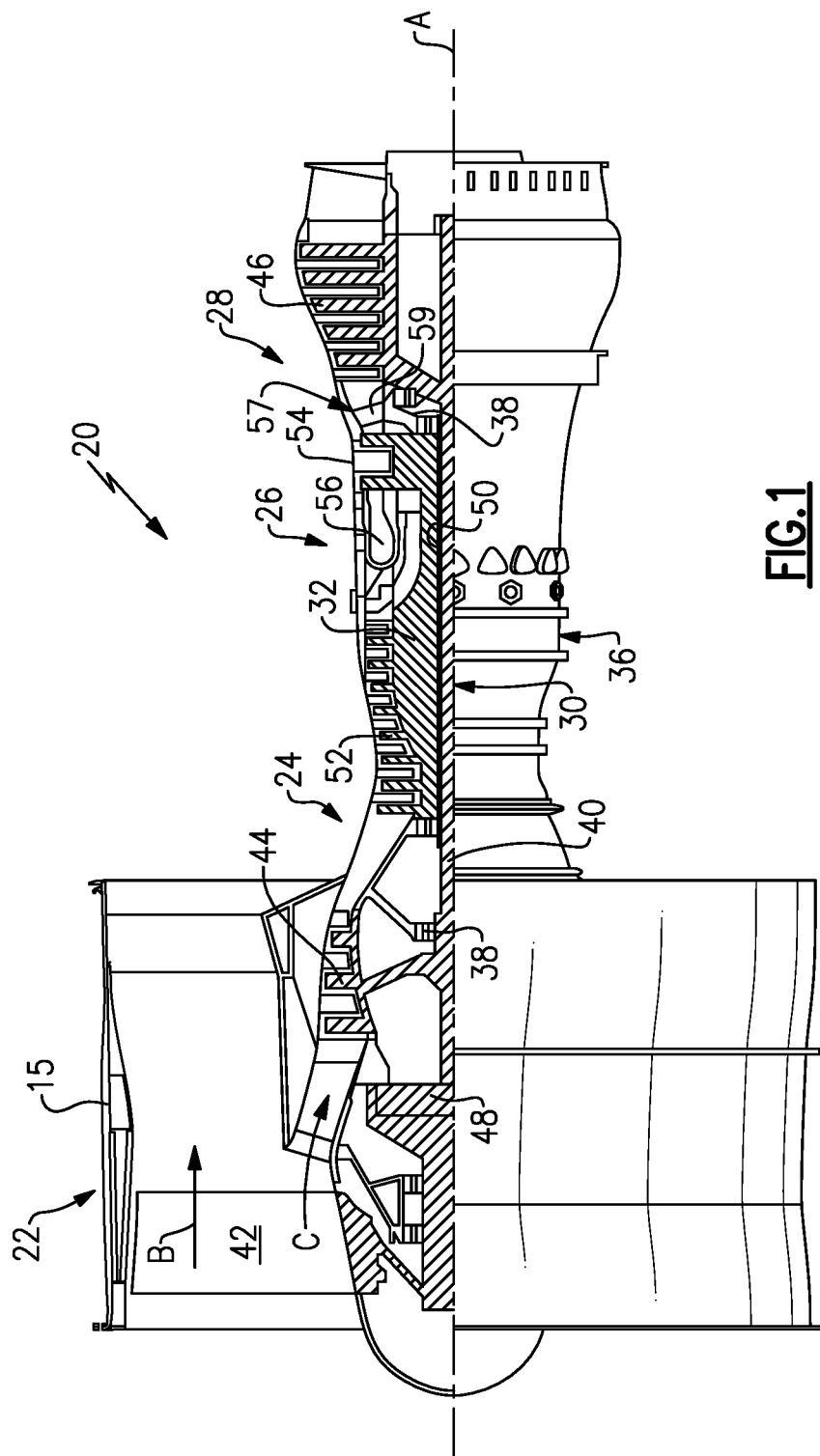
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
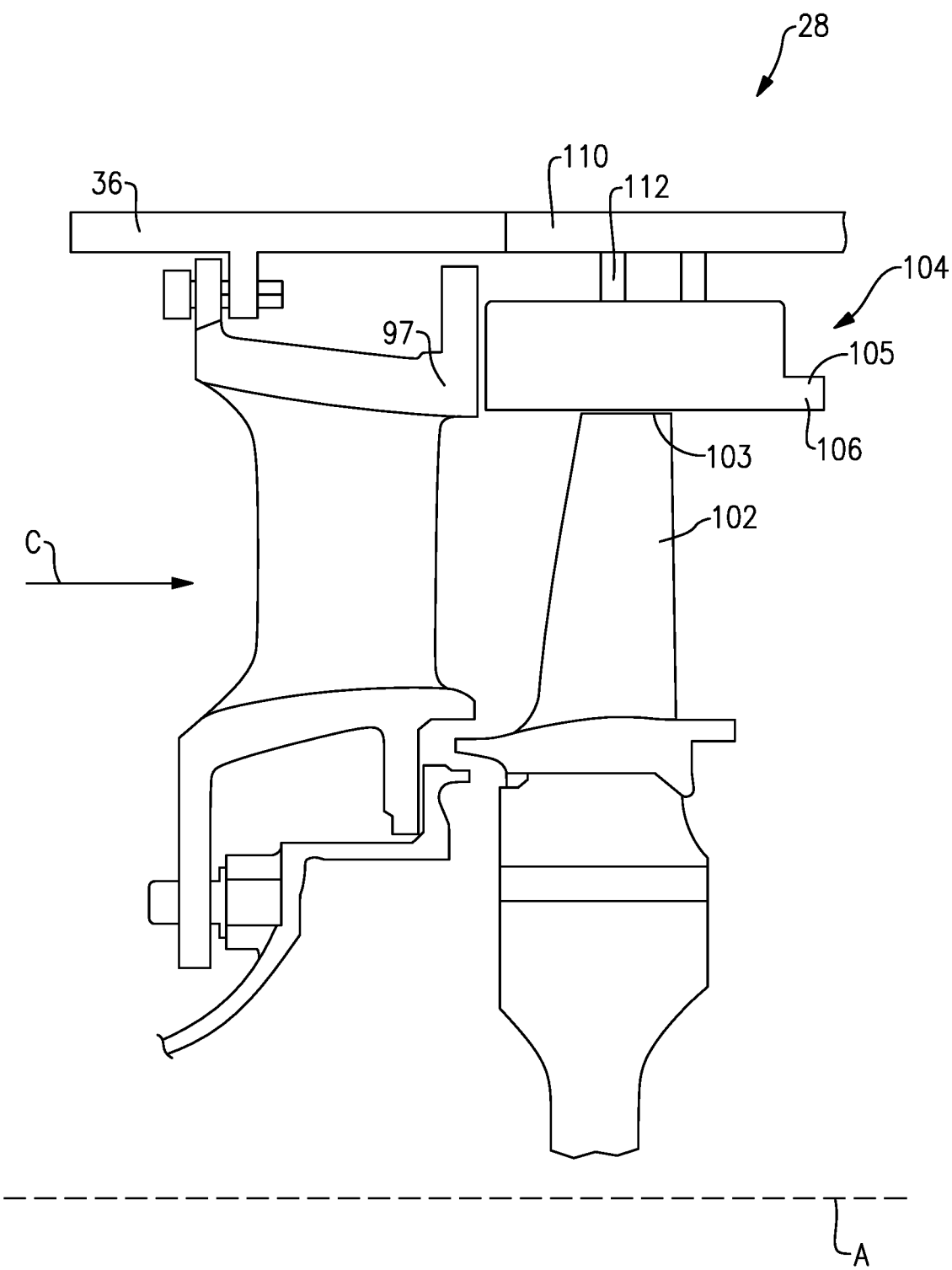
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a ceramic material, such as a ceramic matrix composite ("CMC") or monolithic ceramic.

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
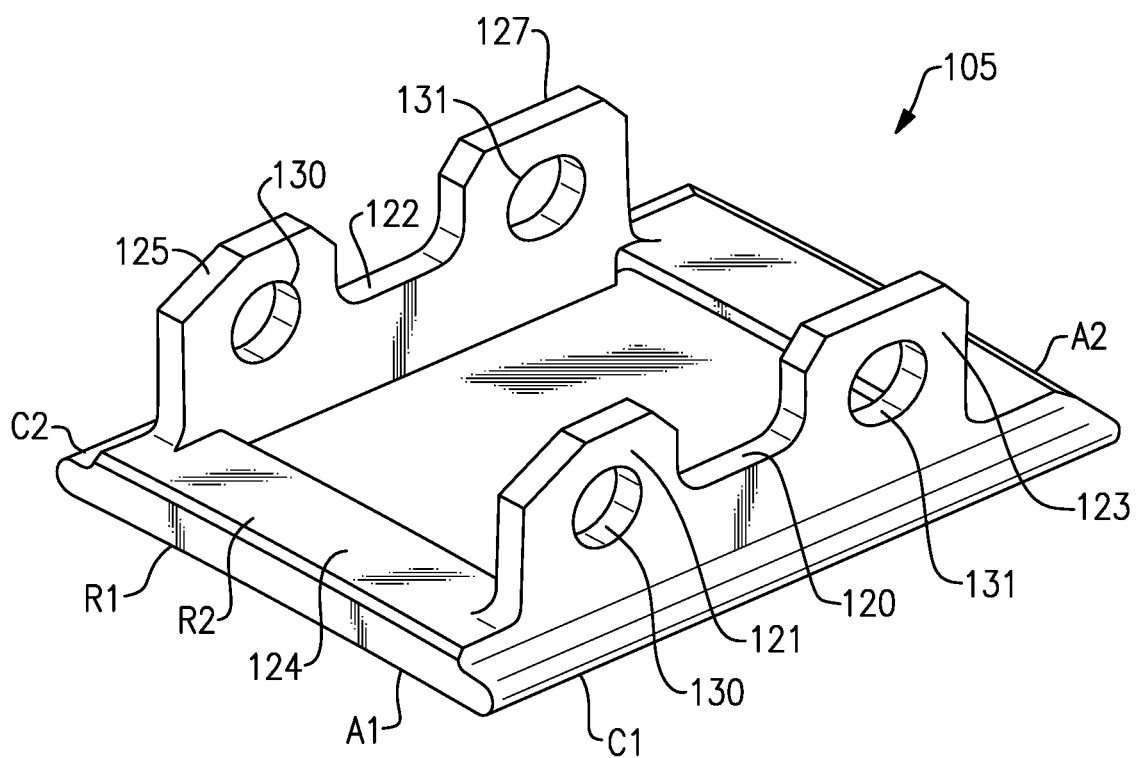
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 and a second wall 122. The first and second walls 120, 122 extend generally radially outward from a base portion 124. The first and second walls 120, 122 extend along an axial length of the seal segment 105. The first and second walls 120, 122 may be substantially perpendicular to the base portion 124, in one example. The first and second walls 120, 122 are arranged near the first and second circumferential sides C1, C2, respectively. The first and second walls 120, 122 extend along the base portion 124 in a generally axial direction, and are circumferentially spaced from one another. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the first and second walls 120, 122 to provide a surface for sealing of the BOAS first and second axial sides A1, A2. First and second tabs 121, 123 extend radially outward from the first wall 120, and first and second tabs 125, 127 extend radially outward from the second wall 122. The tabs 121, 125 are arranged towards the first axial side A1, and are thus forward tabs. The tabs 123, 127 are arranged towards the second axial side A2, and are thus aft tabs.

An aperture 130 extends through the forward tabs 121, 125, and an aperture 131 extends through the aft tabs 123, 127. The apertures 130, 131 may be round or oblong in shape, for example. In some examples, the apertures 130 are different from the apertures 131. For example, the apertures 130 may be oblong while the apertures 131 are round. The apertures 130 may be larger than the apertures 131. The different apertures 130, 131 may allow for some axial movement to prevent mechanically loading the components when there are thermal stresses between the carrier 112 and BOAS segment 105. The apertures 130, 131 provide surfaces for securing the BOAS segment 105 to the carrier 112 and/or support structure 110.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further densified by adding additional material to coat the laminates. In some examples, the base portion 124 and first and second walls 120, 122 may be formed from the same number of laminate plies, and thus have substantially the same thickness. The simple arrangement of the base portion 124 and first and second walls 120, 122 allows for a simple ply layup.

Figure 4:
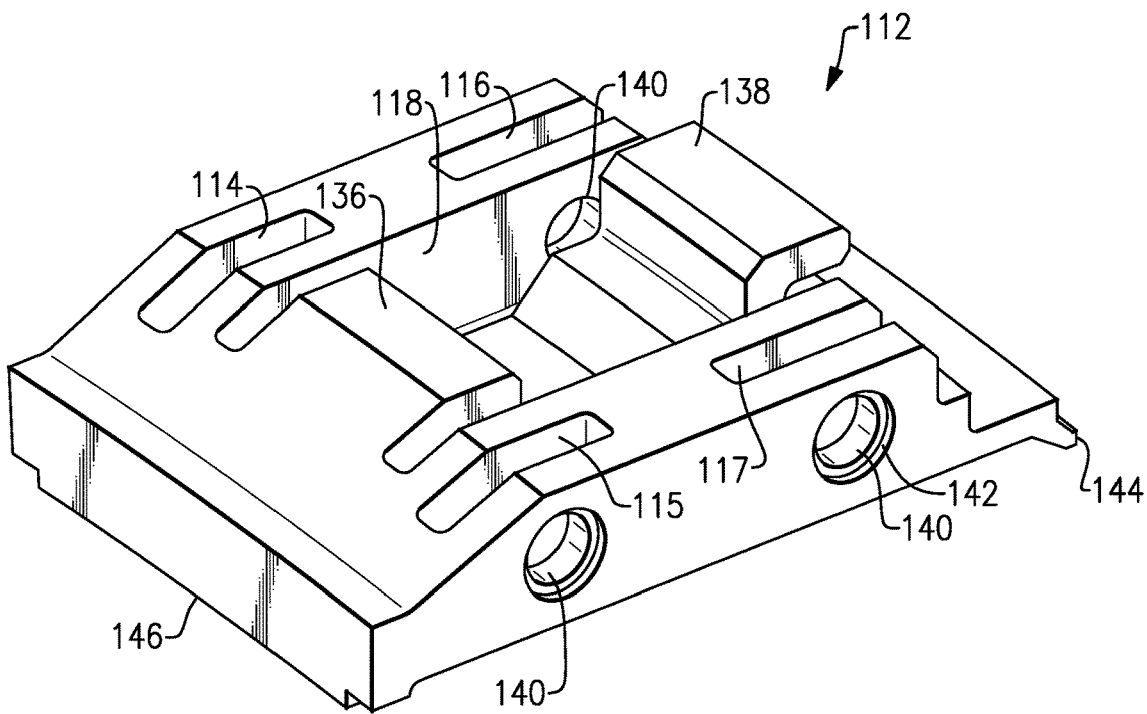
FIG. 4 illustrates an exemplary carrier for a blade outer air seal.

FIG. 4 illustrates an example carrier 112 for the BOAS 106. The carrier 112 includes a body 118 having a plurality of slots. Slots 114, 115 are arranged towards the leading edge 146. Slots 116, 117 are arranged towards the trailing edge 144. The slots 114, 116 are circumferentially spaced from the slots 115, 117. A hole 140 extends into each of the slots 114, 115, 116, 117. Each hole 140 may extend through walls on either side of each slot 114, 115, 116, 117. In some examples, the holes 140 are countersunk. In other words, a larger diameter portion 142 of each hole 140 is arranged towards the circumferentially outward sides.

A first hook 136 and a second hook 138 are arranged between the circumferentially spaced slots 114, 116, 115, 117. The hooks 136, 138 secure the carrier 112 to the support structure 110 (shown in FIG. 2). The hooks may extend in the circumferential direction for a portion of the width of the carrier body 118.

Figure 5:
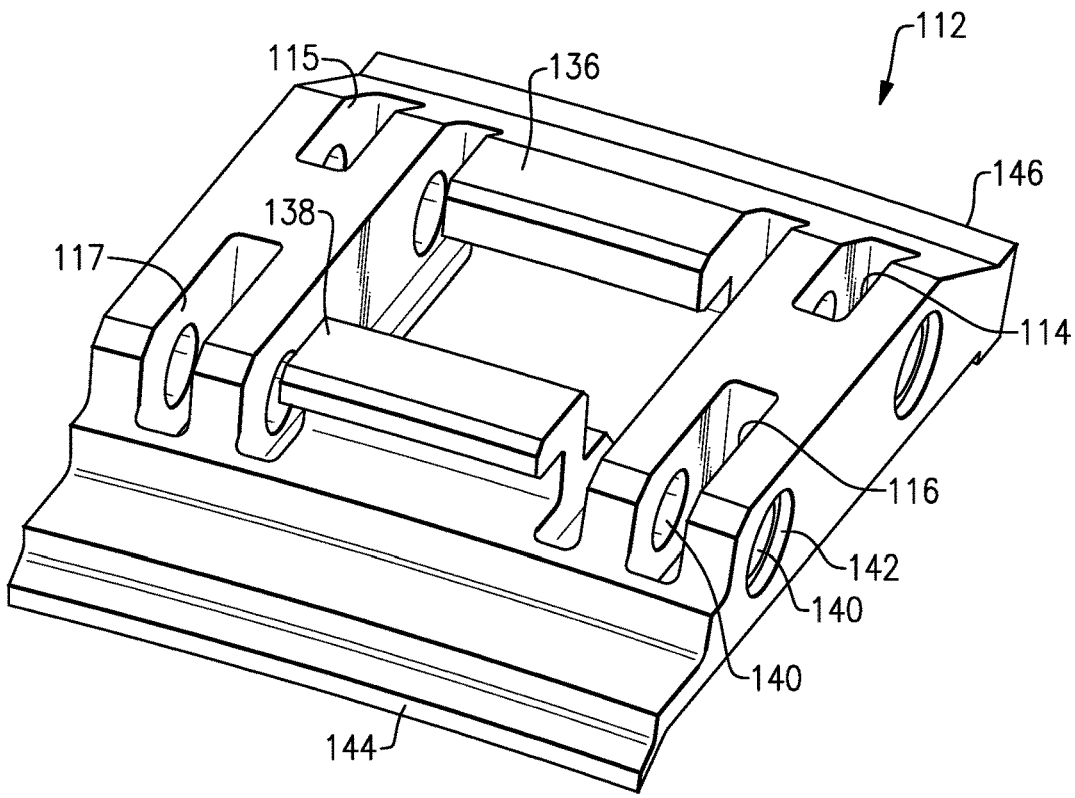
FIG. 5 illustrates the exemplary carrier for a blade outer air seal.

FIG. 5 illustrates another view of the example carrier 112. The trailing edge 144 extends axially aft from the carrier body 118. The trailing edge 144 helps to secure the seal segment 105 axially in place. The leading edge 146 may also help support a load from a vane 97 axially forward of the BOAS assembly 104. In the illustrated example, the hooks 136, 138 extend axially aft towards the trailing edge 144. In other examples, the hooks 136, 138 may extend axially forward towards the leading edge 146.

Figure 6:
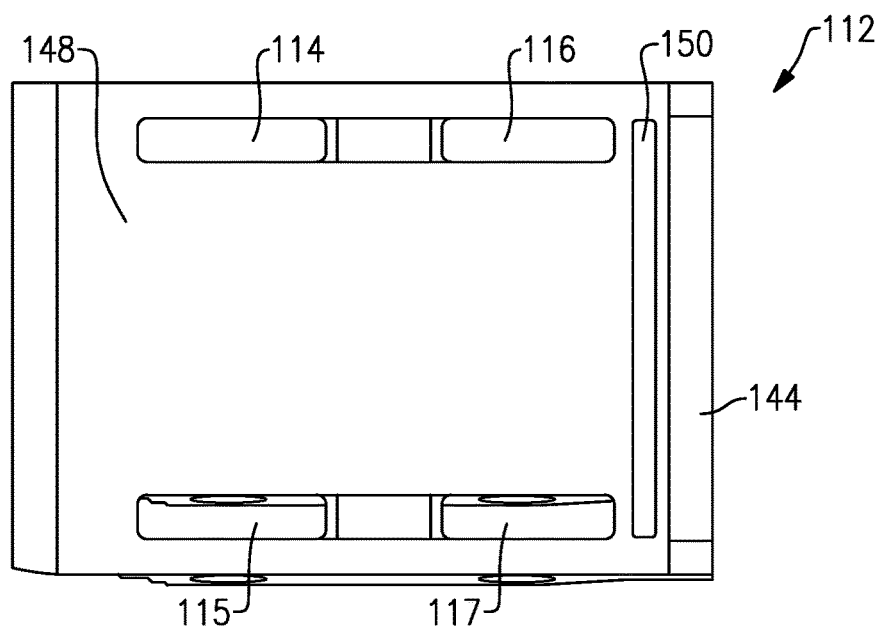
FIG. 6 illustrates a bottom view of the exemplary carrier for a blade outer air seal.

FIG. 6 illustrates a bottom view of the example carrier 112. A bottom surface 148 is the portion of the carrier body 118 that is arranged adjacent the BOAS segment 105. A groove 150 may be arranged in the bottom surface 148. The groove 150 may be arranged towards the trailing edge 144, for example. The groove 150 may receive a rope seal for sealing the BOAS assembly 104. In the illustrated example, the slots 114, 116, 115, 117 extend all the way through the carrier body 118 in the axial direction. In other examples, the slots 114, 116, 115, 117 may extend partially into the carrier body 118. In some examples, the BOAS segment 105 is partially coated with a coating for sealing. For example, a portion of the second radial side R2 may be silica sprayed. This silica sprayed portion may contact a rope seal (shown in FIG. 9), for example.

Figure 7:
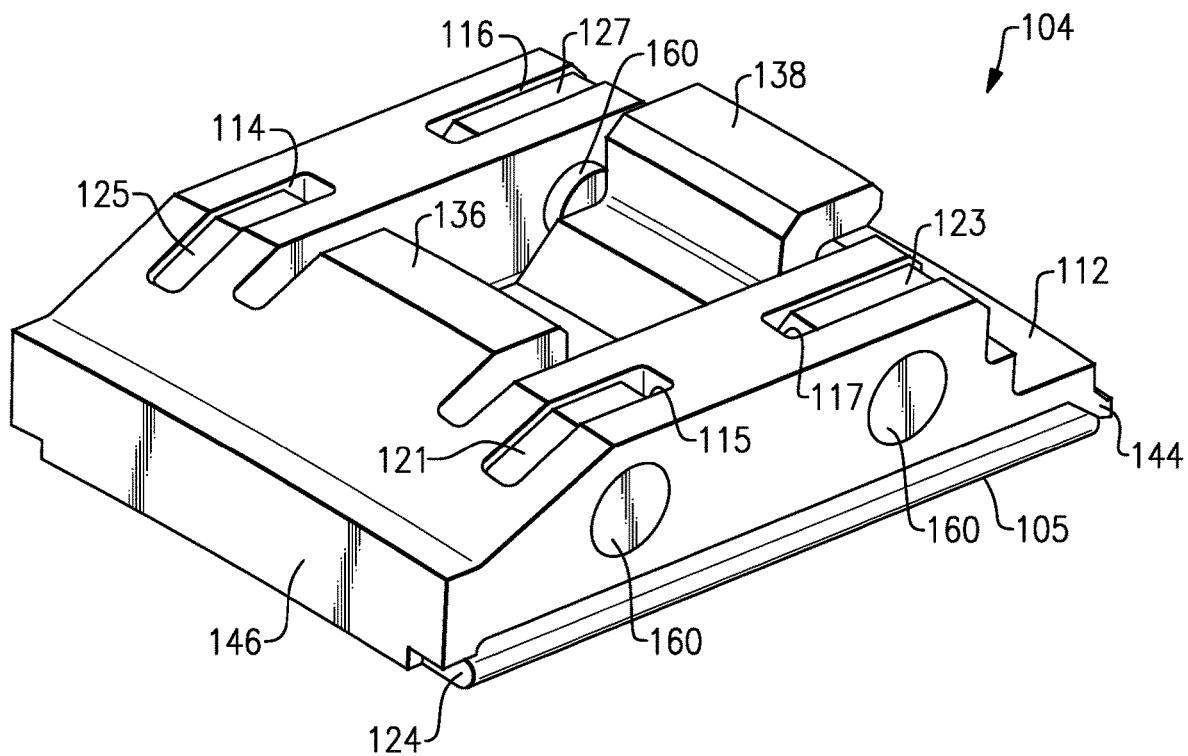
FIG. 7 illustrates a portion of an exemplary blade outer air seal assembly.

FIG. 7 illustrates a portion of the BOAS assembly 104. The BOAS segment 105 is arranged on the carrier 112. The tabs 125, 121, 127, 123 fit within the slots 114, 115, 116, 117, respectively. A pin 160 extends through the holes 140 and the apertures 130, 131 to secure the seal segment 105 to the carrier 112. The pin 160 extends in a substantially circumferential direction. The pin 160 secures the seal segment 105 in the axial and radial directions relative to the carrier 112. The pin 160 may be press fit into the holes 140, for example. In another embodiment, the pin 160 may be press fit into the apertures 130, 131.

In an example, each pin 160 is a unitary piece. The pin 160 may be a metallic material, such as cobalt, for example. A BOAS segment 105 may be secured to the carrier 112 using multiple pins 160. In one example, four pins 160 are used to secure the BOAS segment 105. In other examples, more or fewer pins 160 may be used in a BOAS assembly 104.

Figure 8:
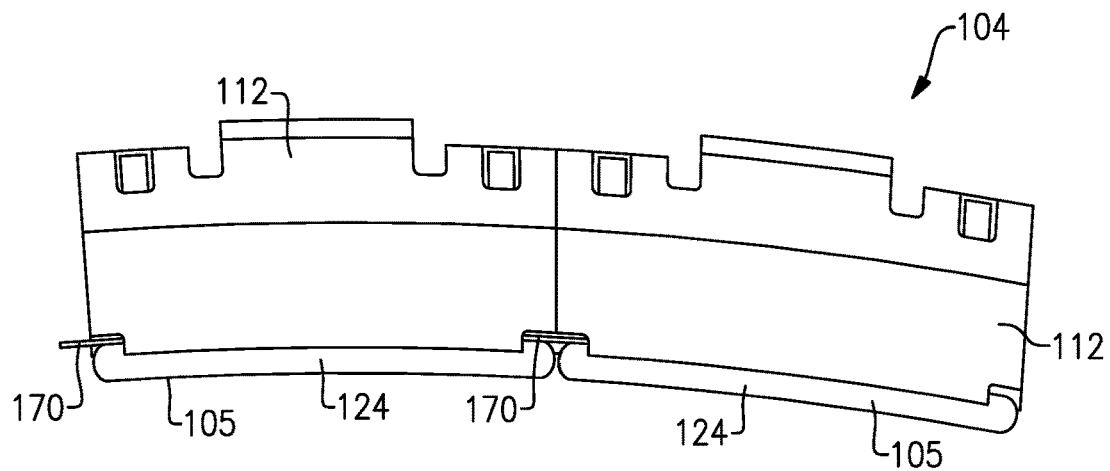
FIG. 8 illustrates a portion of the exemplary blade outer air seal assembly.

FIG. 8 illustrates the BOAS assembly 104. A plurality of carriers 112 each hold a BOAS segment 105. The carriers 112 and BOAS segments 105 are arranged circumferentially about the engine axis A. Although a single carrier 112 is shown holding a single BOAS segment 105, a different ratio of carriers 112 and BOAS segments 105 may be used. For example, one carrier 112 may hold two BOAS segments 105. In some examples, a feather seal 170 is arranged between each of the BOAS segments 105. The feather seal 170 is arranged between the carrier 112 and the BOAS segment 105. The feather seal is radially outward of the base portion 124, for example. This arrangement eliminates the need for a feather seal slot in the BOAS segment 105. The feather seal 170 may be a metallic material or CMC, for example.

Figure 9:
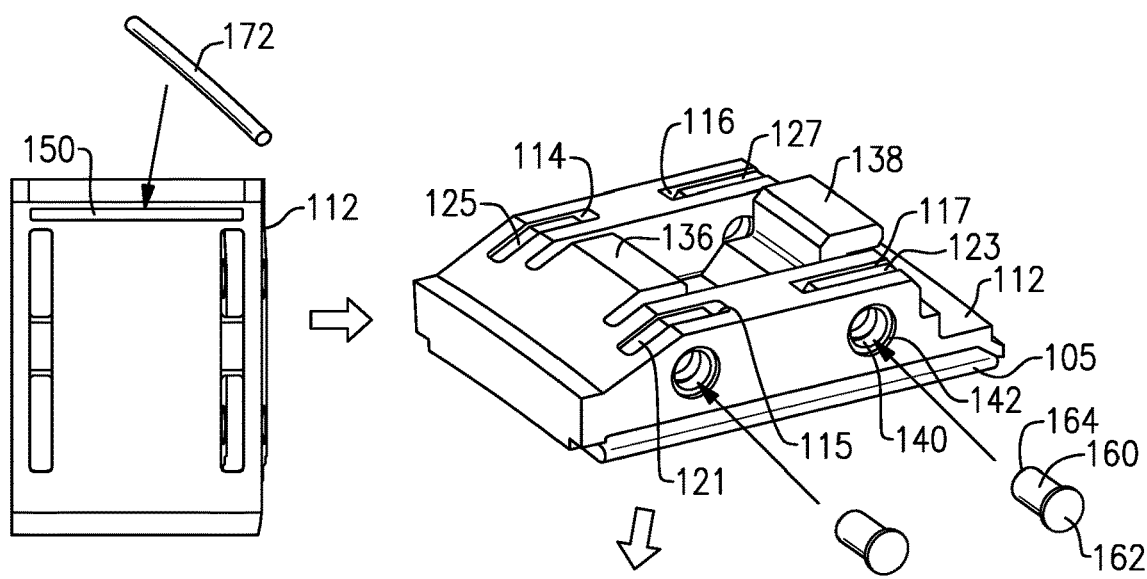
FIG. 9 illustrates a method of assembling a blade outer air seal assembly.
Figure 9:
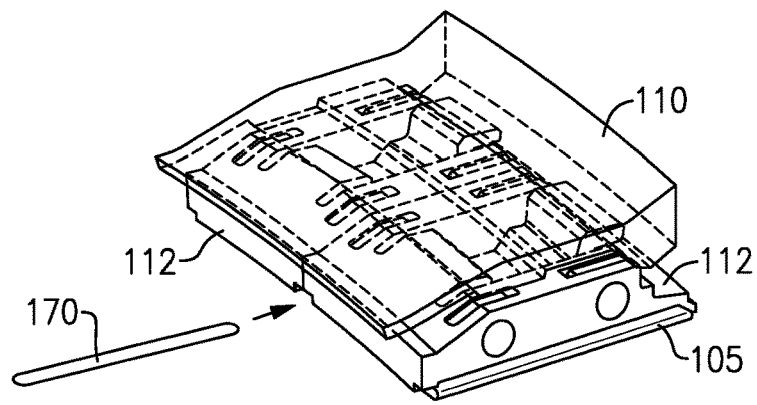

FIG. 9 illustrates an example method of assembling a BOAS 106. First, a rope seal 172 is inserted into the groove 150 on the carrier 112. The rope seal 172 may be a cobalt braid with a fiber core, for example. Then, the BOAS segment 105 is slid radially outward onto the carrier 112. The BOAS segment 105 is mounted such that the tabs 125, 121, 127, 123 on the BOAS segment 105 fit within the slots 114, 115, 116, 117 on the carrier, respectively. Next, the pins 160 are inserted into the holes 140 and apertures 130, 131. Each pin 160 may have a head 162 and an end portion 164. The head 162 retains the pin in position. In some examples, the head 162 fits within the countersunk portion 142 such that the head 162 is flush with the edge of the carrier 112. The carrier 112 is then secured to the support structure 110 via the hooks 136, 138. In some examples, a feather seal 170 is inserted between adjacent BOAS segments 105.

The disclosed CMC BOAS arrangement provides a simple BOAS component with low stresses, by incorporating most of the attachment features in the metallic carrier. The BOAS has axially running vertical rails, which may have lower stresses than circumferentially extending rails. The pin attachment structure may further have lower stresses than some known BOAS attachment methods.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
a plurality of carriers, at least one of the carriers having a slot and a hole extending into the slot;
a blade outer air seal having a plurality of segments extending circumferentially about an axis and mounted in the plurality of carriers;
at least one of the plurality of segments having a base portion and a first wall circumferentially spaced from a second wall, the first and second walls extending axially and radially outwardly from the base portion, the first wall and the second wall each having a forward aperture and an aft aperture; and
a pin extending through the hole and one of the apertures, the pin is oriented in a generally circumferential direction, wherein the first and second walls each have first and second tabs extending radially outward and wherein the forward aperture extends through the first tab and the aft aperture extend through the second tab.

2. The blade outer air seal assembly of claim 1, wherein the forward apertures are larger than the aft apertures.

3. The blade outer air seal assembly of claim 2, wherein the pin extends through the forward aperture and a second pin extends through the aft aperture.

4. The blade outer air seal assembly of claim 1, wherein at least one of the carriers has four slots, each slot having a hole, and a pin extending through each hole.

5. The blade outer air seal assembly of claim 1, wherein the at least one carrier has a hook configured to attach to a support structure.

6. The blade outer air seal assembly of claim 5, wherein the hook extends in a circumferential direction.

7. The blade outer air seal assembly of claim 1, wherein the hole is countersunk.

8. The blade outer air seal assembly of claim 1, wherein the pin is press fit into the hole.

9. The blade outer air seal assembly of claim 1, wherein a rope seal is arranged between the at least one segment and the at least one carrier.

10. The blade outer air seal assembly of claim 1, wherein a feather seal is arranged between two adjacent seal segments.

11. The blade outer air seal assembly of claim 1, wherein the pin is a metallic material.

12. The blade outer air seal assembly of claim 1, wherein the at least one segment is a ceramic material.

13. The blade outer air seal assembly of claim 1, wherein at least a portion of the at least one segment is coated in a silica material.

14. The blade outer air seal assembly of claim 1, wherein the at least one carrier is a metallic material.

* * * * *